Sept. 16, 1952 A. W. FRIEND 2,611,003

BEAM ALIGNMENT DEVICE

Filed Feb. 21, 1951 2 SHEETS—SHEET 1

INVENTOR
Albert W. Friend
BY
ATTORNEY

Sept. 16, 1952 A. W. FRIEND 2,611,003

BEAM ALIGNMENT DEVICE

Filed Feb. 21, 1951 2 SHEETS—SHEET 2

INVENTOR
Albert W. Friend
BY [signature]
ATTORNEY

Patented Sept. 16, 1952

2,611,003

UNITED STATES PATENT OFFICE 2,611,003

BEAM ALIGNMENT DEVICE

Albert W. Friend, Princeton, N. J., assignor to Radio Corporation of America, a corporation of Delaware Application February 21, 1951, Serial No. 212,175

6 Claims. (Cl. 175—21)

This invention relates to deflecting yokes for cathode ray tubes, and particularly to deflecting yokes for cathode ray tubes designed to operate in television receivers.

For the purposes of simplicity in explanation, the invention will be described as applied to the deflection yoke of a cathode ray picture tube as used in television apparatus. It will be clear, however, that the invention is equally applicable to yokes for use in other apparatus using cathode ray beam deflecting yokes.

One of the problems facing the designer of apparatus using cathode ray tubes is that of convergence of the electron beam at all points on the plane of the screen of the tube. When the electron beam converges on the screen of the cathode ray tube, it appears as a pin point. When it does not converge on the screen of the cathode ray tube, it appears as a diffused spot of possibly irregular shape whose area is greater than that of a pin point.

In conventional single beam black and white television apparatus, lack of convergence of the electron beam at all points on the screen will result in a picture that is not uniformly focused. The picture will be in focus where the beam converges on the screen, and somewhat blurred where the beam converges outside the plane of the screen.

While lack of convergence is objectionable in conventional black and white television receivers using a single electron beam, it is less noticeable than when it occurs in color television receivers using a picture tube having a multi-element screen, wherein the particular colored phosphor energized is dependent upon the angle at which the beam is directed upon the screen. This latter feature is present whether the color receiver uses three separate beams having different angles of approach or a single beam whose angle of approach is cyclically varied. In such television receivers, lack of convergence of the electron beam or beams at all points on the screen will result not only in a picture that is not uniformly focused, but also in a picture in which undesirable color fringes appear.

It is an object of this invention to obtain substantial convergence of the electron beam or beams at all points of the screen of a cathode ray tube.

It is a further object of this invention to provide easily adjustable means to obtain substantial convergence of the electron beam or beams at all points of the screen of a cathode ray tube.

Another object of this invention is to provide means to trim the configuration of the magnetic field inside the deflection yoke of a cathode ray tube.

According to the invention, better convergence of the electron beam or beams of cathode ray tubes at all points on the screen is obtained by trimming the configuration of the magnetic field inside the deflection yoke. This trimming is accomplished by providing a yoke core whose elements are movable with respect to each other and to the center axis of the yoke, and whose shape may be altered by moving the said elements. These elements may be segments of a segmented core, or parts of a deformable resilient core.

Other and incidental objects of the invention will be apparent to those skilled in the art from a reading of the following specification and an inspection of the accompanying drawings in which.

Figure 1:
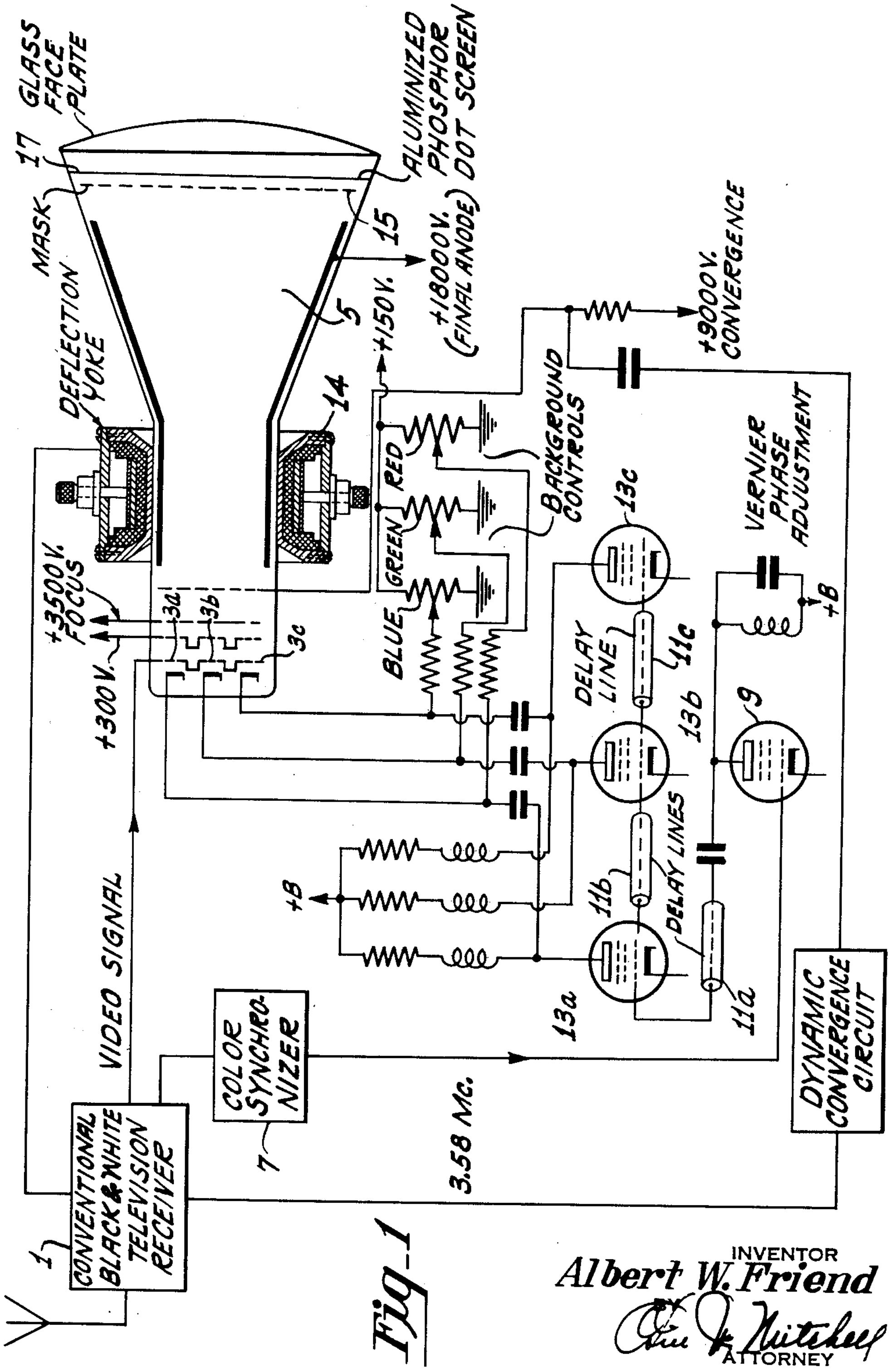
Figure 1 is a schematic representation of a television system employing an embodiment of the invention.

Referring to Figure 1 there is shown in block diagram a television arrangement utilizing a three gun tri-color kinescope. Video signals from a conventional black and white television receiver 1, are applied simultaneously to three control grids 3*a*, 3*b*, and 3*c* of the three gun kinescope 5. Another signal derived from the video amplifier is used to actuate an automatic color phasing and sampling synchronization circuit 7, which produces a 3.58 mc. sampling wave. The latter is applied through an amplifier tube 9 and appropriate delay lines 11*a*, 11*b*, and 11*c* to gating tubes 13*a*, 13*b*, and 13*c* which supply three sampling pulses, differing in phase by 120° at 3.58 mc., to the three cathodes of the kinescope. Thus, each gun is turned on in time sequence corresponding to the original sampling process at the transmitter, and the beam current from each gun excites only one of the three phosphor colors. The deflection circuitry is of the conventional type, and the kinescope is equipped with a deflection yoke 14 constructed according to the invention. The kinescope is of the type utilizing an apertured mask 15 interposed between the guns and a dot phosphor screen 17. A color receiver of this type is well known and a full description of its operation is not believed necessary. However, for those who are interested in a more complete description, reference may be had to "General Description of Receivers for the RCA Color Television System Which Employs the RCA Direct View Tri-Color Kinescopes," April 4, 1950, Radio Corporation of America.

Figure 2:
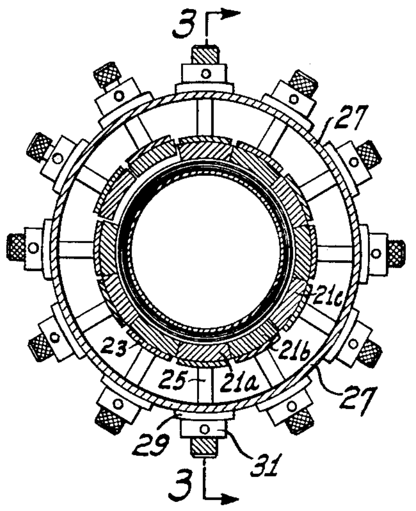
Figure 2 is a cross section of one type of a deflection yoke constructed in accordance with the invention.

Referring to Figure 2, the movable elements of the core of the magnetic yoke are segments of a segmented core. These segments, 21*a*, 21*b*, and 21*c*, are shown as being of equal arc lengths, but segments of differing arc lengths could also be used. Secured to a core segment is plate 23 on which is mounted a shaft or plunger 25. Plunger 25 goes through an aperture in the cylindrical housing 27 of the yoke and through a corresponding aperture in mounting plate 29 and locking block 31. The end of plunger 25 not secured to plate 23 is knurled.

Figure 3:
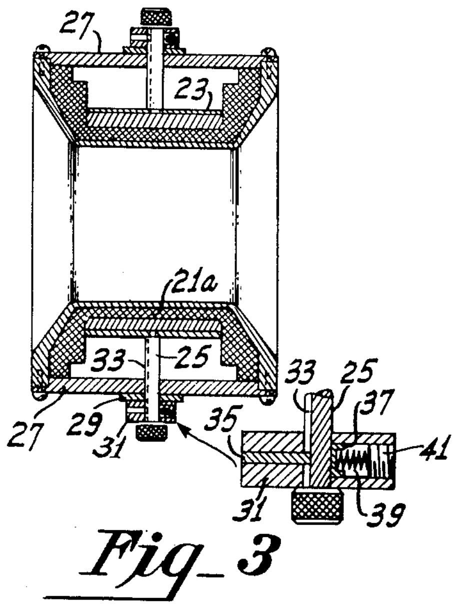
Figure 3 is a cross section along a line "3—3" of the deflection yoke shown in Figure 2.

Referring to Figure 3 there is shown a cross section taken along lines "3—3" of the magnetic yoke of Figure 2. The details of the locking arrangement are illustrated. A slot 33 is provided on plunger 25 parallel to its longitudinal axis. A key 35 engages through locking block 31 into slot 33. Locking block 31 is provided with a threaded aperture into which are engaged shoe 37, spring 39, and screw 41.

The plunger 25 can be moved along its longitudinal axis, radially to the center of the yoke. Key 35 prevents plunger 25 from rotating about its longitudinal axis. Depending upon the position of screw 41, shoe 37 exerts by means of spring 39 a slight pressure upon plunger 25 to hold it in place while its position is adjusted, or a greater pressure to hold it securely into place after its final position has been determined.

Figure 4:
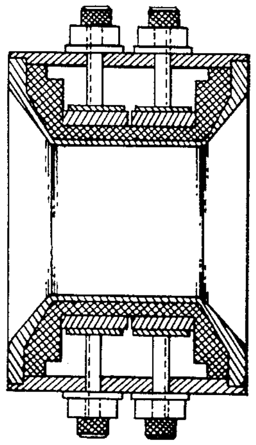
Figure 4 is a modified form of the deflection yoke shown in Figure 3.

Figure 4 shows a modification of the deflection yoke shown in Figure 3 and in which the core comprises two rings each of which is cut into segments whose positions are adjusted in the same fashion as the core segments of Figures 2 and 3.

Figure 5:
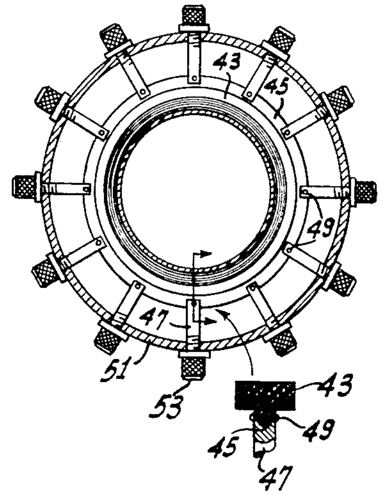
Figure 5 is a cross section of another type of deflection yoke constructed in accordance with the invention.

Figure 5 shows an embodiment of the invention in which the movable elements of the core are parts of a deformable resilient core. Such a core may be made by mixing neoprene rubber, vinylite, polyethylene or a similar material with finely divided ferro-magnetic particles. This core 43 is provided with a rim 45 which engages into a slot at one extremity of plunger 47 and is held there by means of locking pin 49. Plunger 47 engages through an aperture in the cylindrical housing 51 of the yoke. The other extremity of plunger 47 is threaded, and provided with a threaded knurled knob 53.

By moving the core elements relatively to each other, the configuration of the magnetic field inside the deflection yoke can be changed and adjusted for best convergence. In the embodiments shown in Figures 2, 3, and 4, this is accomplished by sliding the plungers along their longitudinal axes, thereby moving the segments of the segmented core. In the embodiment shown in Figure 5, the same object is accomplished by rotating the threaded knurled knobs about their axes, thereby moving the plungers along their longitudinal axes. The shape of the deformable core is altered, and elements of the core are thus moved with respect to each other and to the center axis of the yoke.

Other modifications of the invention readily suggest themselves. In the embodiments comprising a single ring core, only part of the core elements may be made movable while others may remain fixed. In embodiments comprising a plurality of rings, one ring may be made fixed and unadjustable, while another may be made of movable elements, or of a combination of movable and of fixed elements.

Having thus described my invention, what is claimed is:

1. A cathode ray tube deflection yoke having a plurality of deflecting coils, a magnetic core cradled by said deflecting coils, said magnetic core comprising a plurality of elements, and means to move one of said elements along a radius from the center axis of said yoke.

2. A cathode ray tube deflection yoke having a plurality of deflecting coils, a magnetic core cradled by said deflecting coils, said magnetic core comprising a plurality of segments, and means to move one of said segments along a radius from the center axis of said yoke.

3. A cathode ray tube deflection yoke having a plurality of deflecting coils, a magnetic core cradled by said deflecting coils and comprising a plurality of rings, one of said rings comprising a plurality of segments, and means to move selectively said segments along a radius from the center axis of said yoke.

4. A cathode ray tube deflection yoke having a plurality of deflecting coils, a magnetic core cradled by said deflecting coils, said magnetic core comprising a plurality of elements, and a shaft attached to at least one of said elements whereby said element may be moved along a radius from the center axis of said yoke.

5. A cathode ray tube deflection yoke having a plurality of deflection coils, a magnetic core cradled by said deflection coils, said magnetic core comprising a plurality of segments, and a shaft attached to at least one of said segments whereby said segment may be moved along a radius from the center axis of said yoke.

6. A cathode ray tube deflection yoke having a plurality of deflection coils, a magnetic core cradled by said deflection coils, said magnetic core comprising a plurality of elements, a shaft attached to at least one of said elements whereby said element may be moved along a radius from the center axis of said yoke, and locking means to lock said shaft into position.

ALBERT W. FRIEND.

REFERENCES CITED

The following references are of record in the file of this patent:

UNITED STATES PATENTS

| Number | Name | Date |
|---|---|---|
| 2,157,182 | Maloff | May 9, 1939 |
| 2,165,803 | Maloff | July 11, 1939 |
| 2,445,676 | Hillier | Dec. 7, 1948 |
| 2,467,538 | Shoupp | Apr. 19, 1949 |
| 2,499,065 | Heppner | Feb. 28, 1950 |
| 2,513,221 | Webb | June 27, 1950 |
| 2,541,446 | Trott | Feb. 13, 1951 |

FOREIGN PATENTS

| Number | Country | Date |
|---|---|---|
| 501,931 | Great Britain | Mar. 8, 1939 |